US012627883B2

(12) United States Patent
Fukushima

(10) Patent No.: US 12,627,883 B2
(45) Date of Patent: May 12, 2026

(54) IMAGING APPARATUS, IMAGE CAPTURING SYSTEM, CONTROL METHOD OF IMAGING APPARATUS, AND NON-TRANSITORY COMPUTER READABLE MEDIUM

(71) Applicant: CANON KABUSHIKI KAISHA, Tokyo (JP)

(72) Inventor: Yuki Fukushima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/437,024

(22) Filed: Feb. 8, 2024

(65) Prior Publication Data

US 2024/0187730 A1 Jun. 6, 2024

Related U.S. Application Data

(63) Continuation of application No. 17/939,090, filed on Sep. 7, 2022, now Pat. No. 11,936,980.

(30) Foreign Application Priority Data

Jan. 5, 2022 (JP) ................................. 2022-000485

(51) Int. Cl.
*H04N 23/667* (2023.01)
*G06F 3/01* (2006.01)
(Continued)

(52) U.S. Cl.
CPC ........... *H04N 23/667* (2023.01); *G06F 3/013* (2013.01); *H04N 5/268* (2013.01); *H04N 23/631* (2023.01); *H04N 23/90* (2023.01)

(58) Field of Classification Search
CPC .... H04N 23/667; H04N 5/268; H04N 23/631; H04N 23/90; H04N 23/62; H04N 23/63; H04N 23/663; G06F 3/013
See application file for complete search history.

(56) References Cited

U.S. PATENT DOCUMENTS

| | | |
|---|---|---|
| 10,554,921 B1 | 2/2020 | Lim et al. |
| 10,666,856 B1 | 5/2020 | Rueckner |
| (Continued) | | |

FOREIGN PATENT DOCUMENTS

| | | |
|---|---|---|
| JP | 2012099889 A | 5/2012 |
| JP | 2019041236 A | 3/2019 |
| (Continued) | | |

OTHER PUBLICATIONS

Japanese Office Action, which is enclosed without an English Translation, that issued in Japanese Patent Application No. 2023-016042.

*Primary Examiner* — Timothy J Henn
(74) *Attorney, Agent, or Firm* — Cowan, Liebowitz & Latman, P.C.

(57) ABSTRACT

An imaging apparatus acquires an image capturing instruction, performs an image capturing processing in a case where a position of an eye of a user is a first condition upon acquiring the image capturing instruction, and requests a second imaging apparatus, which is different from the imaging apparatus, to perform the image capturing processing in a case where the position of the eye of the user is a second condition upon acquiring the image capturing instruction.

8 Claims, 8 Drawing Sheets

(51) Int. Cl.
　　*H04N 5/268*　　　(2006.01)
　　*H04N 23/63*　　　(2023.01)
　　*H04N 23/90*　　　(2023.01)

(56)　　　　　　　References Cited

U.S. PATENT DOCUMENTS

| | | | | |
|---|---|---|---|---|
| 11,936,980 | B2 * | 3/2024 | Fukushima | H04N 23/667 |
| 2014/0320723 | A1 * | 10/2014 | Shirono | H04N 23/63 |
| | | | | 348/333.05 |
| 2015/0042852 | A1 * | 2/2015 | Lee | H04N 23/45 |
| | | | | 348/262 |
| 2016/0055366 | A1 | 2/2016 | Oyama | |
| 2016/0156838 | A1 * | 6/2016 | Cheng | H04N 23/90 |
| | | | | 348/222.1 |
| 2017/0126966 | A1 | 5/2017 | Cheng | |
| 2017/0230585 | A1 * | 8/2017 | Nash | H04N 13/239 |
| 2018/0224723 | A1 * | 8/2018 | Inai | H04N 23/60 |
| 2019/0312973 | A1 | 10/2019 | Engelke | |
| 2023/0119935 | A1 | 4/2023 | Sztuk et al. | |
| 2023/0276116 | A1 * | 8/2023 | Agrawal | H04N 5/607 |

FOREIGN PATENT DOCUMENTS

| | | |
|---|---|---|
| JP | 2020-205560 A | 12/2020 |
| KR | 1020110070630 A | 6/2011 |

\* cited by examiner 312b 315 300

305(306a)

306b

306

306c

306d

306e

312a 315b 312b 315a 300

305(306a)

306b

306

306c

306d

306e

312a

314

314b 314a 314c

306b

300

306c

306d

IMAGING APPARATUS, IMAGE CAPTURING SYSTEM, CONTROL METHOD OF IMAGING APPARATUS, AND NON-TRANSITORY COMPUTER READABLE MEDIUM

CROSS-REFERENCE TO RELATED APPLICATION

This application is a continuation of application Ser. No. 17/939,090, filed Sep. 7, 2022, the entire disclosure of which are hereby incorporated by reference.

BACKGROUND OF THE INVENTION

Field of the Invention

The present invention relates to an imaging apparatus, an image capturing system, a control method of the imaging apparatus, and a non-transitory computer readable medium.

Description of the Related Art

Japanese Patent Application Publication No. 2020-205560 discloses that in a case of capturing both an image of a subject at a long distance and an image of a subject at a short distance, the user holds a plurality of imaging apparatuses where a telephoto lens and a standard lens are installed respectively, and captures images switching the imaging apparatuses from one hand to the other depending on the subject to be imaged.

However in some cases, the imaging apparatuses or lenses installed in the imaging apparatuses may be large or heavy. This makes it difficult and troublesome for the user to switch the imaging apparatuses from one hand to the other.

SUMMARY OF THE INVENTION

With the foregoing in view, it is an object of the present invention to allow the user to capture images using a plurality of imaging apparatuses, without switching the plurality of imaging apparatuses from one hand to the other.

An aspect of the present invention is an imaging apparatus including: a processor; and a memory storing a program which, when executed by the processor, causes the imaging apparatus to: acquire an image capturing instruction; perform an image capturing processing in a case where a position of an eye of a user is a first condition upon acquiring the image capturing instruction; and request a second imaging apparatus, which is different from the imaging apparatus, to perform the image capturing processing in a case where the position of the eye of the user is a second condition upon acquiring the image capturing instruction, wherein the first condition is different from the second condition.

An aspect of the present invention is a control method of an imaging apparatus, the method including steps of: acquiring an image capturing instruction; performing an image capturing processing using the imaging apparatus in a case where a position of an eye of a user is a first condition upon acquiring the image capturing instruction; and requesting a second imaging apparatus, which is different from the imaging apparatus, to perform the image capturing processing in a case where the position of the eye of the user is a second condition upon acquiring the image capturing instruction, wherein the first condition is different from the second condition.

Further features of the present invention will become apparent from the following description of exemplary embodiments with reference to the attached drawings.

DESCRIPTION OF THE EMBODIMENTS

Embodiments of the present invention will be described with reference to the accompanying drawings.

First Imaging Apparatus

Figure 1:
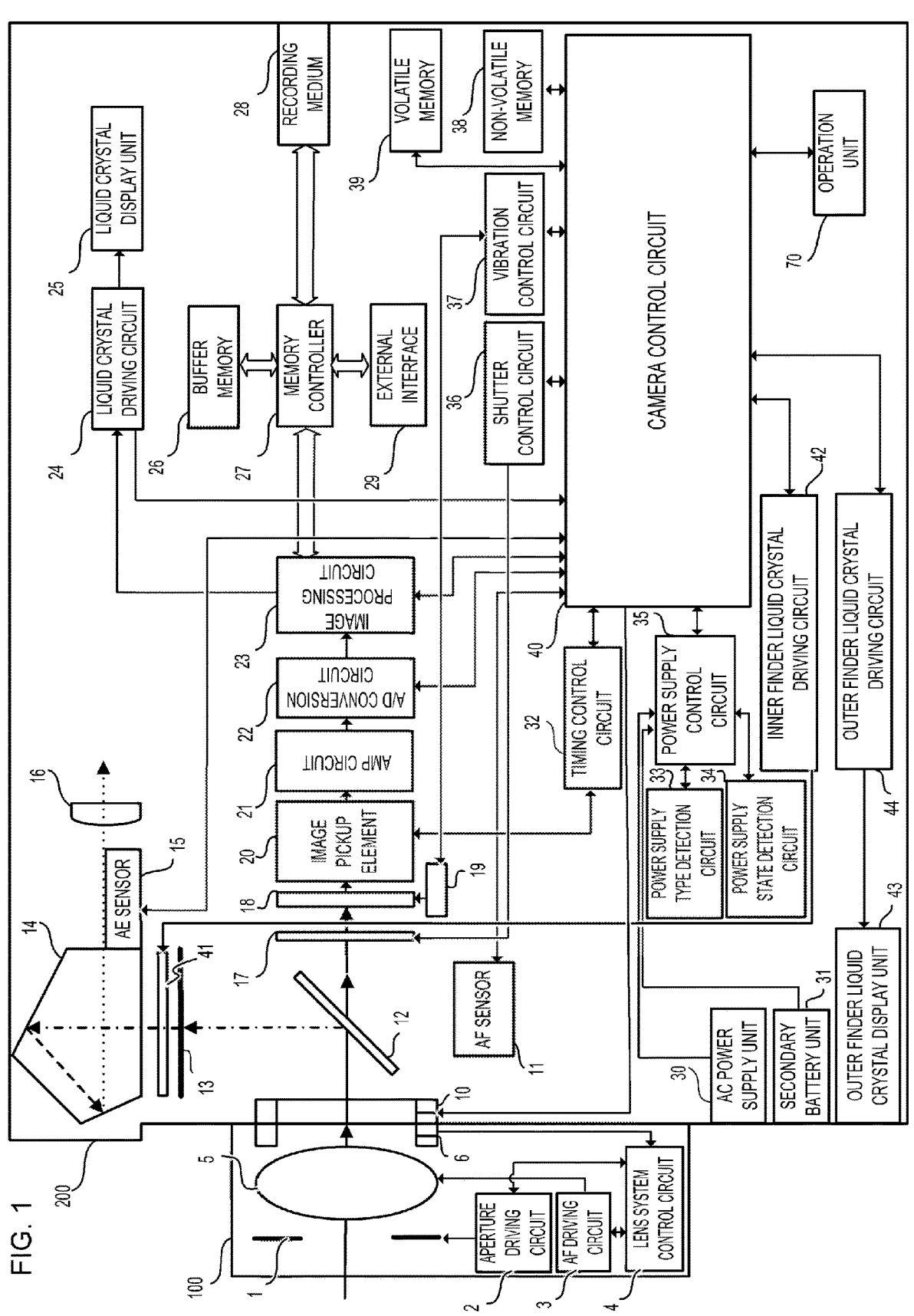
FIG. 1 is a block diagram of a first imaging apparatus and a lens unit.

FIG. 1 is a block diagram depicting a configuration of a lens unit 100 and a first imaging apparatus 200 of the present embodiment. In the description of the present embodiment, the first imaging apparatus 200 is assumed to be a digital camera having interchangeable lenses. However, the first imaging apparatus 200 may be any electronic apparatus that can capture images.

The lens unit 100 is a lens unit that includes interchangeable image capturing lenses. A lens 5 is normally constituted of a plurality of lenses, but only one lens is illustrated in FIG. 1 for simplification. A communication terminal 6 is a communication terminal for the lens unit 100 to communicate with the first imaging apparatus 200. A communication terminal 10 is a communication terminal for the first imaging apparatus 200 to communicate with the lens unit 100. The lens unit 100 communicates with a camera control circuit 40 via the communication terminals 6 and 10. A lens system control circuit 4 controls an aperture 1 via an aperture driving circuit 2, and changes a position of the lens 5 via an AF driving circuit 3, so as to control focus. Further, the camera control circuit 40 acquires an open aperture value and minimum aperture value of the lens unit 100 via the communication terminals 6 and 10.

An AE sensor 15 measures the brightness of the subject via the lens unit 100. An AF sensor 11 outputs information on defocus amount to the camera control circuit 40. Based on the information on the defocus amount, the camera control circuit 40 controls the lens unit 100. The position and orientation of a quick return mirror 12 are controlled (up/down) at exposure by an actuator (not illustrated) in accordance with the control by the camera control circuit 40. By observing a focusing screen 13 via a penta-prism 14 and a finder 16, the user can check the focal point and composition of an optical image of the subject acquired via the lens unit 100.

A focal plane shutter 17 can freely control the exposure time of an image pickup element 20 based on the control by the camera control circuit 40. An optical filter 18 is normally constituted of a low pass filter or the like. The optical filter 18 cuts off high frequency components of light that enter through the focal plane shutter 17, and guides the subject image to the image pickup element 20.

The image pickup element 20 is an image pickup element (image sensor) for which a CCD, CMOS or the like is normally used. The image pickup element 20 performs photoelectric conversion on a subject image formed on the image pickup element 20 via the lens unit 100, and captures the subject image as electric signals.

An AMP circuit 21 amplifies the captured electric signals with a gain in accordance with the image capturing sensitivity that is set. An A/D conversion circuit 22 converts analog signals, which were converted into electric signals by the image pickup element 20, into digital signals (image data).

An image processing circuit 23 performs image processing (filter processing, color conversion processing, gamma/knee processing) on the image data acquired from the A/D conversion circuit 22, and outputs the processed data to a memory controller 27. The image processing circuit 23 includes a D/A conversion circuit. The image processing circuit 23 can also convert image data (image data acquired from the A/D conversion circuit 22 and image data inputted from the memory controller 27) into analog signals, and output the analog signals to a liquid crystal display unit 25 via a liquid crystal driving circuit 24. Thereby the image processing circuit 23 can perform the display processing for the liquid crystal display unit 25. The image processing and the display processing by the image processing circuit 23 are controlled by the camera control circuit 40. The camera control circuit 40 also performs white balance adjustment based on the color balance information on the captured image.

The liquid crystal display unit 25 is a rear monitor to display an image. The display to display an image is not limited to a liquid crystal display, but other types of displays, such as an organic EL display, may be used instead of the liquid crystal display unit 25. The liquid crystal display unit 25 can also display an image of a subject that the image pickup element 20 is capturing in real-time.

The memory controller 27 stores unprocessed image data inputted from the image processing circuit 23 in a buffer memory 26, or stores image-processed image data in a recording medium 28. The memory controller 27 can also load image data from the buffer memory 26 or the recording medium 28, and outputs the image data to the image processing circuit 23. Further, the memory controller 27 can store image data sent via an external interface 29 in the recording medium 28. Furthermore, the memory controller 27 can output the image data stored in the recording medium 28 to the outside via the external interface 29. For the external interface, an interface conforming to such standards as USB, IEEE, HDMI (registered trademark) or the like can be used. The recording medium 28 is a removable recording medium, such as a memory card. The recording medium 28 may be an internal memory. The camera control circuit 40 controls the driving timing of the image pickup element 20 via a timing control circuit 32.

The power supply control circuit 35 is a circuit to control power that is supplied from a power supply (AC power supply unit 30 or a secondary battery unit 31). The secondary battery unit 31 is removable from the first imaging apparatus 200. The power supply control circuit 35 switches the power supply ON/OFF in accordance with the control by the camera control circuit 40. The power supply control circuit 35 also notifies the camera control circuit 40 of information on the current power supply state detected by a power supply state detection circuit 34, and of information on the type of the current power supply detected by a power supply type detection circuit 33.

A vibration control circuit 37 is a circuit to vibrate a piezoelectric element 19 connected to the optical filter 18. In accordance with the control by the camera control circuit 40, the vibration control circuit 37 vibrates the piezoelectric element 19 at a predetermined amplitude of vibration, for a predetermined vibration time, and in a predetermined axial direction of vibration.

A non-volatile memory 38 is a non-volatile recording medium. The non-volatile memory 38 can hold various data (such set values as shutter speed, aperture value, image capturing sensitivity which are set by the user, and other data) even in a state where power of the first imaging apparatus 200 is OFF. A volatile memory 39 holds temporarily stored data (e.g. information on internal state of the first imaging apparatus 200, information on the recording medium 28 that is removable from the first imaging apparatus 200).

A frame to indicate a distance measuring point at which auto focus is currently performed, an icon to indicate a setting state of the camera, and the like, are displayed on an inner finder liquid crystal display unit 41 via an inner finder liquid crystal driving circuit 42. By looking into the finder 16, the user can visually recognize an image and icons which are displayed on the inner finder liquid crystal display unit 41. Various set values of the camera, such as the shutter speed and aperture, are displayed on an outer finder liquid crystal display unit 43 via an outer finder liquid crystal driving circuit 44.

An operation unit 70, having various operation members, functions as an input unit to receive operation instructions from the user (an acquisition unit to acquire instructions from the user). The operation unit 70 includes a sub-electronic dial 203, a power switch 204, a protect button 205, a delete button 206 and a magnifying mode button 207 (See FIG. 6). The operation unit 70 also includes a reproduction instruction button 208, a menu button 209, a multi-controller 211 and an auto focus start button 214.

The camera control circuit 40 is a control unit that controls each unit included in the first imaging apparatus 200. The camera control circuit 40 develops a program recorded in the non-volatile memory 38 using the volatile memory 39 as a work memory, and executes the program so as to execute various processing steps mentioned later. The camera control circuit 40 also controls the focal plane shutter 17 via a shutter control circuit 36.

Figure 2:
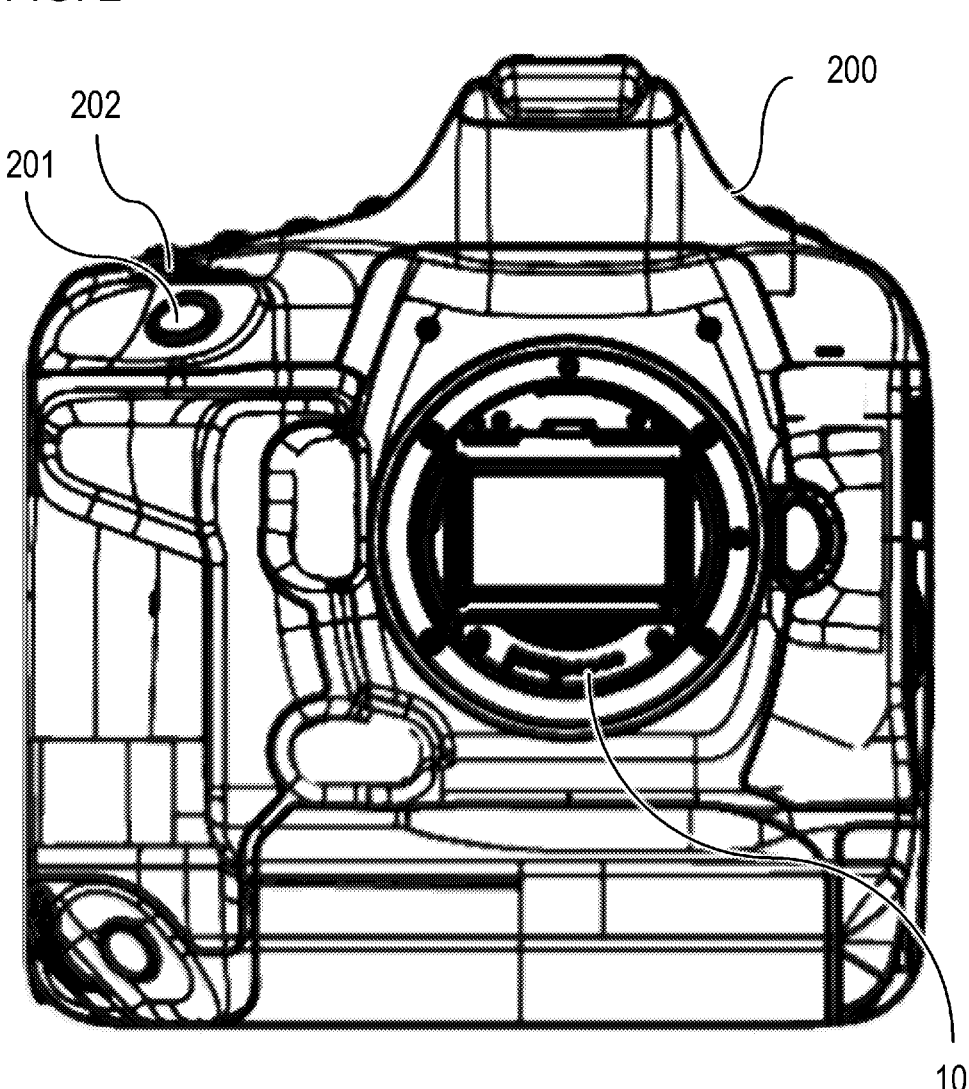
FIG. 2 is an external view of the first imaging apparatus.

FIG. 2 is an external overview of the first imaging apparatus 200 of the present embodiment from the front side. A release button 201 is a button to instruct preparation of image capturing and to instruct execution of image capturing. If the release button 201 is half depressed, the brightness measurement and focusing are performed for the subject. If the release button 201 is fully depressed, the shutter is released, and the image of the subject is captured.

A main electronic dial 202 is a rotational operation member. By turning the main electronic dial 202, the user can set such set values as the shutter speed and aperture, or perform fine adjustment of the magnification in the magnifying mode.

Second Imaging Apparatus

Figure 3:
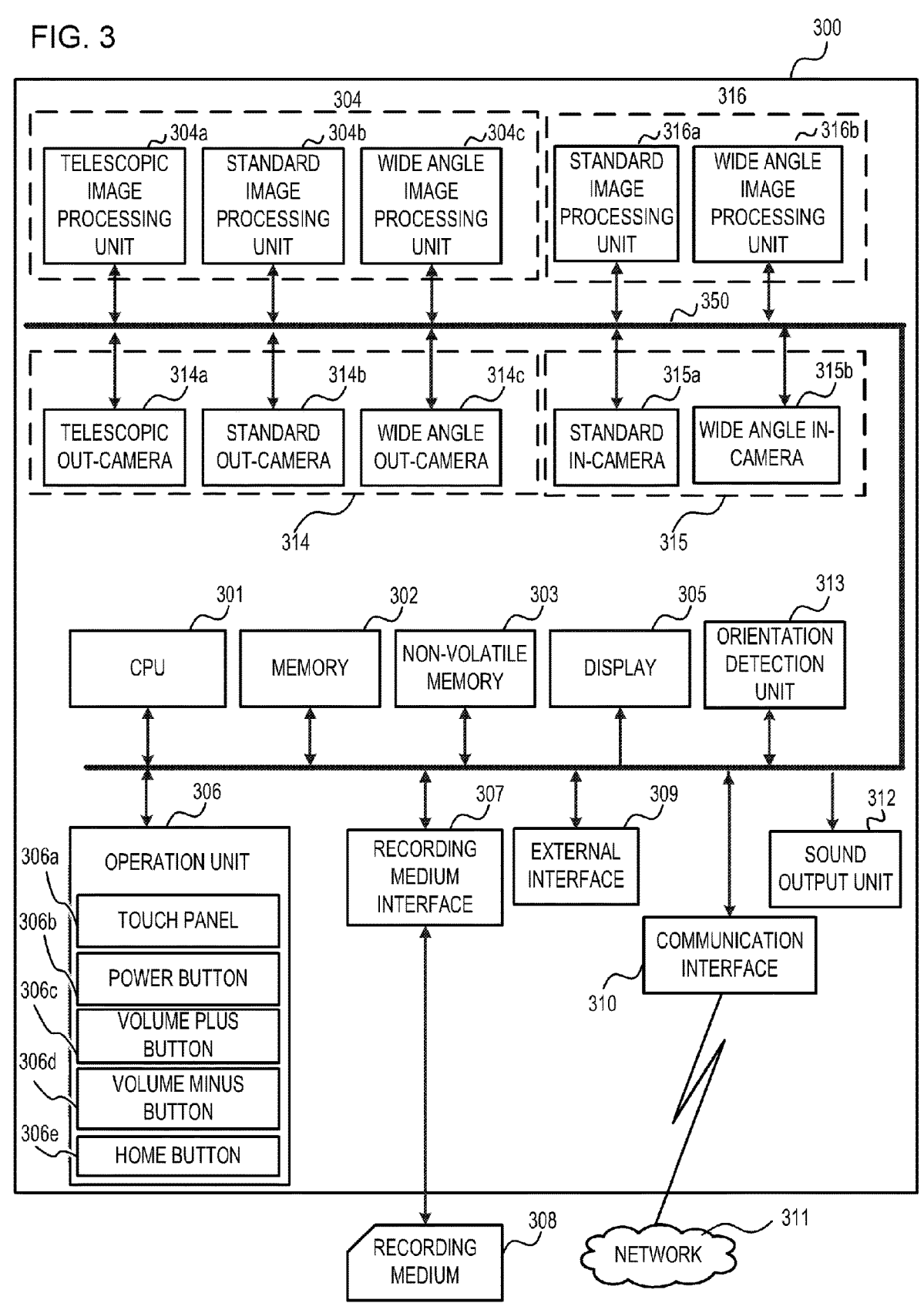
FIG. 3 is a block diagram of a second imaging apparatus.

FIG. 3 is a block diagram depicting the configuration of a second imaging apparatus 300 of the present embodiment. In the description of the present embodiment, the second imaging apparatus 300 is assumed to be a smartphone, but may be any electronic apparatus that can capture images, such as a digital camera.

A second imaging apparatus 300 includes a CPU 301, a memory 302, a non-volatile memory 303, an image processing unit 304, a display 305, an operation unit 306, a recording medium interface 307, an external interface 309 and a communication interface 310. The second imaging apparatus 300 also includes a sound output unit 312, an orientation detection unit 313, an out-camera unit 314, an in-camera unit 315 and an image processing unit 316. These composing elements are connected to an internal bus 350, and can exchange data with each other via the internal bus 350.

A central processing unit (CPU) 301 is a control unit that controls the second imaging apparatus 300 in general. The CPU 301 includes at least one processor or circuit. The CPU 301 controls each composing element of the second imaging apparatus 300 using the memory 302 as a work memory, in accordance with a program stored in the non-volatile memory 303, for example.

The memory 302 includes a RAM (e.g. volatile memory using a semiconductor element), for example. The non-volatile memory 303 stores image data, sound data, other data, various programs for the CPU 301 to operate, and the like. The non-volatile memory 303 includes a flash memory, a ROM, or the like, for example.

The image processing unit 304 performs various types of image processing on an image acquired by the out-camera unit 314. The various types of image processing are, for example, A/D conversion processing, D/A conversion processing, compression encoding processing for image data, decoding processing, magnifying/demagnifying processing (resizing), noise reduction processing, and color conversion processing.

The image processing unit 304 includes a telescopic image processing unit 304a, a standard image processing unit 304b, and a wide angle image processing unit 304c. The telescopic image processing unit 304a performs various types of image processing on an image acquired by a telescopic out-camera 314a based on the control by the CPU 301. The standard image processing unit 304b performs various types of image processing on the image acquired by a standard out-camera 314b, based on the control by the CPU 301. The wide angle image processing unit 304c performs various types of image processing on an image acquired by a wide angle out-camera 314c, based on the control by the CPU 301.

The image processing unit 316 performs various types of image processing on an image acquired by the in-camera unit 315. A standard image processing unit 316a performs various types of image processing on an image acquired by a standard in-camera 315a, based on the control of the CPU 301. A wide angle image processing unit 316b performs various types of image processing on an image acquired by a wide angle in-camera 315b, based on the control of the CPU 301. In the present embodiment, it is assumed that the telescopic out-camera 314a, the standard out-camera 314b and the wide angle out-camera 314c are lens units that are independent from each other. In other words, the out-camera unit 314 includes three lens units. In the same manner, the standard in-camera 315a and the wide angle in-camera 315b are lens units that are independent from each other, and the in-camera unit 315 includes two lens units. In other words, the second imaging apparatus 300 indicated in FIG. 3 includes five lens units.

In the following description, the telescopic out-camera 314a, the standard out-camera 314b, the wide angle out-camera 314c, the standard in-camera 315a and the wide angle in-camera 315b are collectively called "camera", unless a distinction is necessary. Further, the telescopic image processing unit 304a, the standard image processing unit 304b, the wide angle image processing unit 304c, the standard image processing unit 316a, and the wide angle image processing unit 316b are collectively called "image processing unit", unless distinction is necessary.

In the present embodiment, one image processing unit corresponds to one camera (imaging unit). However, one image processing unit may correspond to two cameras, or one image processing unit may correspond to three cameras. In other words, one image processing unit may perform various types of image processing on images acquired by a plurality of cameras.

Each camera captures an image of a subject in accordance with the image capturing parameters which are set for each camera. The image capturing parameters include, for example, parameters on luminance (shutter speed, aperture value, stroboscopic emission state, ISO sensitivity, brightness), or parameters on color (white balance (WB), color temperature), and the like. The CPU 301 can acquire the image capturing parameters from each camera that are set for each camera.

Each image processing unit can perform various types of image processing on various images (e.g. images stored in the non-volatile memory 303 and recording medium 308, images acquired via the external interface 309, images acquired via the communication interface 310). The various types of image processing performed by each image processing unit include A/D conversion processing, D/A conversion processing, compression encoding processing for image data, decoding processing, magnifying/demagnifying processing (resizing), noise reduction processing and color conversion processing. Each image processing unit may be constituted of dedicated circuit blocks to perform specific image processing. Depending on the type of the image processing, the CPU 301 may perform the image processing according to a program, instead of using each image processing unit.

The display 305 is a rear monitor to display an image and a graphical user interface (GUI) screen constituted of a GUI. The display 305 is not limited to a liquid crystal type, but another type of display that can display images, such as an organic EL display, may be used. The CPU 301 generates an image (image signals) for each composing element based on the display control signal in accordance with the program. The display 305 displays an image generated by each composing element. The configuration of the second imaging apparatus 300 may be only up to the interface for inputting an image, and an external monitor (e.g. TV), may display images instead of the display 305. In other words, the second imaging apparatus 300 need not include the display 305.

The operation unit 306 is an input device to receive user operation. The operation unit 306 includes a text information input device (e.g. keyboard), a pointing device (e.g. mouse, touch panel), buttons, a dial, a joy stick, a touch sensor, a touch pad, or the like. The touch panel is an input device which is superimposed on the plane of the display 305, so that coordinate information in accordance with the contacted position is outputted. In the present embodiment, the operation unit 306 includes a touch panel 306a, a power button 306b, a volume plus button 306c, a volume minus button 306d, and a home button 306e.

A recording medium 308, such as a memory card, can be installed in the recording medium interface 307. The recording medium interface 307 reads data from the recording medium 308 and writes data to the recording medium 308. The recording medium 308 may be an internal storage included in the second imaging apparatus 300.

The external interface 309 is an interface to connect with an external apparatus via a cable or wirelessly, so as to input/output images and sound. The communication interface 310 is an interface to communicate with an external apparatus, a network 311, or the like, so as to transmit/receive various data, such as a file and a commands The sound output unit 312 outputs the sound of a moving image and music, an operation tone, a ring tone, various notification tones, and the like. The sound output unit 312 includes a sound output terminal 312a to connect an earphone or the like, and a speaker 312b. The sound output unit 312 may output sound via wireless communication.

An orientation detection unit 313 detects an orientation (inclination from each axis of yaw, roll, pitch) of the second imaging apparatus 300 with respect to the gravity direction. Based on the orientation detected by the orientation detection unit 313, the CPU 301 can determine the state of the second imaging apparatus 300 (e.g. whether the second imaging apparatus 300 is held horizontally, vertically, turned upward, turned downward, or set to a diagonal direction). For the orientation detection unit 313, at least one of an acceleration sensor, a gyro sensor, a geo magnetic sensor, an azimuth sensor, an altitude sensor, and the like, can be used, or a plurality of these sensors may be combined.

The out-camera unit 314 includes three out-cameras (imaging units), which are disposed in an enclosure of the second imaging apparatus 300 on the opposite side of the display 305. The three out-cameras included in the out-camera unit 314 are the telescopic out-camera 314a, the standard out-camera 314b and the wide angle out-camera 314c. The out-camera unit 314 is used mainly for capturing an image of a subject that exists on the opposite side of the user (image take), with respect to the enclosure of the second imaging apparatus 300.

The focal distance of the telescopic out-camera 314a is longer than the focal distance of the standard out-camera 314b. This means that compared with the standard out-camera 314b, the telescopic out-camera 314a can capture an image on the telescopic side in more detail. The focal distance of the wide angle out-camera 314c is shorter than the focal distance of the standard out-camera 314b. This means that compared with the standard out-camera 314b, the wide angle out-camera 314c can capture an image at a wider angle. In other words, the focal distance is shorter and the angle of view is wider in order of: the telescopic out-camera 314a, the standard out-camera 314b, and the wide angle out-camera 314c. In the present embodiment, it is assumed that the telescopic out-camera 314a includes a lens having a mechanism that optically magnifies according to a predetermined magnification, but may have a mechanism that allows the user to manually change the magnification. The telescopic out-camera 314a, the standard out-camera 314b and the wide angle out-camera 314c can capture images simultaneously.

In the present embodiment, it is assumed that one imaging sensor is disposed for one out-camera. In other words, a number of imaging sensors for the out-camera unit 314 disposed in the second imaging apparatus 300 is the same as the number of out-cameras of the second imaging apparatus 300 (that is, three in the present embodiment). In the same manner, a number of imaging sensors for the in-camera unit 315 is the same as the number of in-cameras of the second imaging apparatus 300 (that is, two in the present embodiment). However, it is not always necessary to dispose one imaging sensor for one camera (lens unit). In other words, the three out-cameras 314a to 314c may share one imaging sensor (in other words, the second imaging apparatus 300 has one imaging sensor for the out-camera unit 314). Further, in the above description, three out-cameras can perform imaging simultaneously (in parallel or in time-division), but it is not always necessary for all three out-cameras to perform imaging simultaneously. Any two of the three out-cameras may perform imaging, or one camera may perform imaging alone.

The in-camera unit 315 includes two in-cameras (imaging units), which are disposed in the enclosure of the second imaging apparatus 300 on the same surface as the display 305. The in-camera unit 315 includes the standard in-camera 315a and the wide angle in-camera 315b. The in-camera unit 315 is used mainly for capturing an image of the user who is capturing the image. The in-camera unit 315 need not include two in-cameras, and may include only one in-camera, for example.

Here any one of the out-cameras of the out-camera unit 314 and either one of the in-cameras of the in-camera unit 315 may be driven and perform imaging simultaneously.

In the above description, the out-camera and the in-camera perform imaging simultaneously, but it is not always necessary for two cameras to perform imaging simultaneously, and only one of the out-camera and the in-camera may perform imaging by itself. Further, in the same manner as the out-camera unit 314, the two in-cameras 315a and 315b may be driven and perform imaging simultaneously, or only one in-camera may perform imaging by itself.

The CPU 301 can detect the following operation on or state of the touch panel 306a.

A finger or a pen which was not touching the touch panel 306a newly touches the touch panel 306a, that is, the start of touch (hereafter Touch-Down)

A finger or a pen is touching the touch panel 306a (hereafter Touch-On)

A finger or a pen is moving while touching the touch panel 306a (hereafter Touch-Move)

A finger or a pen touching the touch panel 306a is released from the touch panel 306a, that is, the end of touch (hereafter Touch-Up)

Nothing is touching the touch panel 306a (hereafter Touch-Off)

When Touch-Down is detected, Touch-On is detected at the same time. Unless Touch-Up is detected after Touch-Down, Touch-On is continuously detected normally. In a case where Touch-Move is detected as well, Touch-On is detected at the same time. Even if Touch-On is detected, Touch-Move is not detected unless the touch position is moving. When Touch-Up of the finger and the pen is detected and nothing is touching the touch panel 306a, Touch-Off is detected.

These operations/states and coordinates of the position on the touch panel 306a, where the finger or the pen is touching, are notified to the CPU 301 via the internal bus. Based on the notified information, the CPU 301 determines which operation (touch operation) was performed on the touch panel 306a.

For Touch-Move, the moving direction of the finger or the pen moving on the touch panel 306a can also be determined for the vertical component and horizontal component on the touch panel 306a respectively based on the change of the positional coordinates. In the case where Touch-Move for a predetermined distance or more is detected, it is determined that the slide operation was performed.

An operation of quickly moving a finger for a certain distance while touching the touch panel 306a and releasing the finger is called a "flick". In other words, flick is an operation of quickly tracing (flicking) on the touch panel 306a. In a case where Touch-Move for at least a predetermined distance at a predetermined speed or faster is detected and Touch-Up is detected immediately thereafter, it is determined that flick is performed (it is determined that flick occurred after the slide operation).

A touch operation of touching a plurality of locations (e.g. two points) simultaneously and moving these touch positions close together is called a "Pinch-In", and moving these touch positions away from each other is called a "Pinch-Out". Pinch-In and Pinch-Out are collectively called "pinch operation" (or simply called "pinch"). For the touch panel 306a, any one of the various types of touch panels may be used, such as a resistive film type, an electrostatic capacitive type, a surface acoustic wave type, an infrared type, an electromagnetic induction type, an image recognition type and a photosensor type. Some types detect touch when the touch panel is actually contacted, and other types detect touch when a finger or a pen approaches the touch panel, but either type can be used here.

In the present embodiment, a case where three cameras of the second imaging apparatus 300 (telescopic out-camera 314a, standard out-camera 314b and wide angle out-camera 314c) are simultaneously driven, or any two of these three cameras are driven will be described. In the second imaging apparatus 300, when a plurality of out-cameras are driven, a plurality of live view images (LV images) captured by the plurality of out-cameras are displayed on the display 305, whereby the user can easily select an optimum angle-of-view. The live view image (LV image) is an image that the camera is capturing in real-time. The present embodiment is applicable even in a case where only one of the telescopic out-camera 314a, the standard out-camera 314b and the wide angle out-camera 314c is driven.

Figures 4A, 4B, 4C:
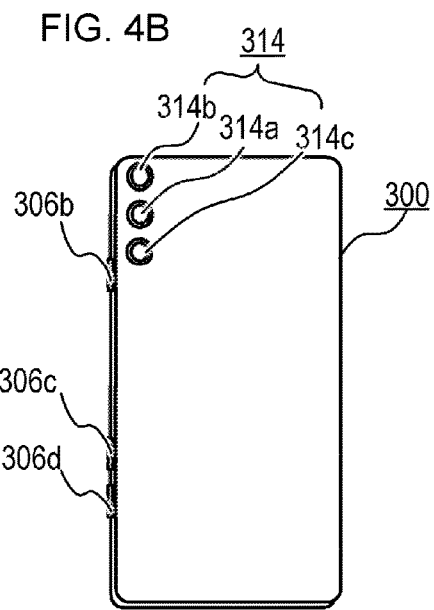
FIGS. 4A to 4C are external views of the second imaging apparatus.

FIGS. 4A to 4C are external views of the second imaging apparatus 300 of the present embodiment. FIG. 4A is a front view of the second imaging apparatus 300, and FIG. 4B is a rear view of the second imaging apparatus 300. FIG. 4C is a front view of the second imaging apparatus 300 that has two in-cameras.

The display 305 is a display unit disposed on the front face of the second imaging apparatus 300. The display 305 displays an image and various information on the display surface. The display 305 can display a live view image (LV image) of a subject captured by the out-camera unit 314 (out-cameras 314a to 314c) or the in-camera unit 315 (in-cameras 315a and 315b). The out-camera unit 314 includes the telescopic out-camera 314a, the standard out-camera 314b and the wide angle out-camera 314c.

The operation unit 306 includes the touch panel 306a, the power button 306b, the volume plus button 306c, the volume minus button 306d and the home button 306e.

The touch panel 306a is a touch operation member. The touch panel 306a detects a touch operation performed on the display surface (operation surface) of the display 305.

The power button 306b is a button to switch the display 305 ON/OFF (display/non-display). If the user continually presses the power button 306b for a certain length of time (e.g. three seconds) (long press), the power of the second imaging apparatus 300 switches ON/OFF.

The volume plus button 306c and the volume minus button 306d are volume buttons to control the volume of the sound outputted by the sound output unit 312. When the user presses the volume plus button 306c, the volume of the sound outputted by the sound output unit 312 increases. When the user presses the volume minus button 306d, the volume of the sound outputted by the sound output unit 312 decreases.

In the image capturing standby state after the camera application to capture an image starts up, the volume plus button 306c and the volume minus button 306d can also be used as shutter buttons to instruct image capturing each time these buttons are pressed. The user may freely set such that the second imaging apparatus 300 executes a specific processing in the case where the power button 306b and the volume minus button 306d are simultaneously pressed, or in the case where the volume minus button 306d is quickly pressed several times.

The home button 306e is an operation button to cause the display 305 to display a home screen, which is a startup screen of the second imaging apparatus 300. If the home button 306e is pressed when an application has started up in the second imaging apparatus 300, the started application is temporarily closed, and the home screen is then displayed. The home button 306e is assumed to be a physical button (a button that can be physically pressed) here, but may be a button of the graphical user interface (GUI) displayed on the display 305.

The sound output terminal 312a is a terminal to output sound to an earphone, an external speaker, or the like. The sound output terminal 312a is an earphone jack, for example. The speaker 312b is an internal speaker to output sound. In the case of outputting sound from the sound output unit 312, the sound is outputted from the speaker 312b if a predetermined terminal (e.g. earphone cord) is not installed in the sound output terminal 312a.

Electrical Configuration of First Imaging Apparatus and Accessory

Figure 5:
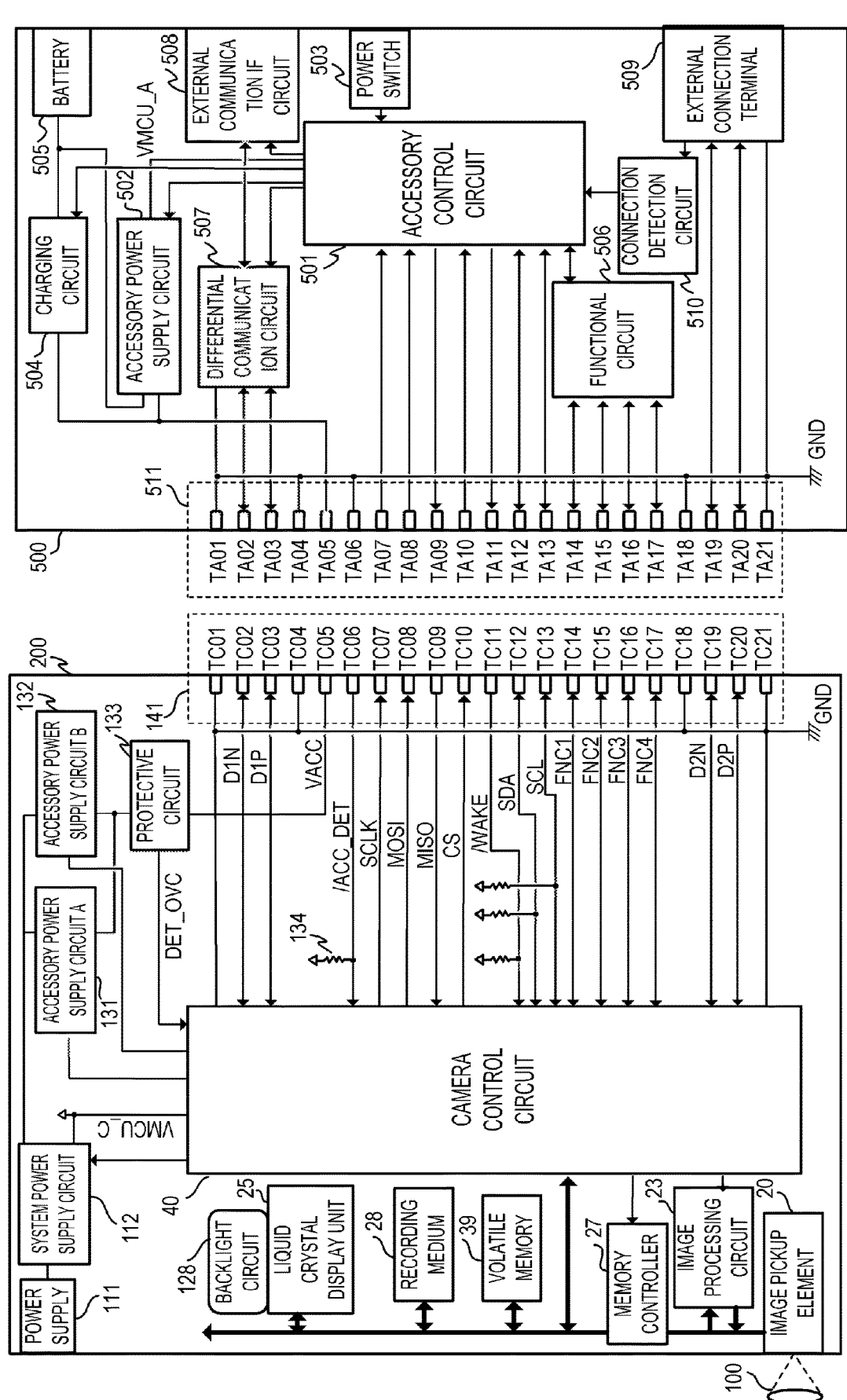
FIG. 5 is an electrical block diagram of the first imaging apparatus and an accessory.

FIG. 5 indicates an electrical configuration of the first imaging apparatus 200 and the accessory 500. Contacts (terminals) TC01 to TC21 of a camera connection unit 141 disposed in the first imaging apparatus 200 contact with a plurality of contacts TA01 to TA21 of an accessory connection unit 511 disposed in the accessory 500 respectively. Here each of the contacts TC01 to TC21 contacts with a contact of contacts TA01 to TA21 having a same number on a one-to-one basis. For example, the contact TC10 is connected with the contact TA10 having the same number "10". Thereby the first imaging apparatus 200 and the accessory 500 are electrically connected.

Configuration of First Imaging Apparatus

A power supply 111 supplies power for the first imaging apparatus 200 to operate. The power supply 111 is either the AC power supply unit 30 or the secondary battery unit 31.

The camera control circuit 40 is a circuit (control unit) that controls the first imaging apparatus 200 in general. The camera control circuit 40 has a microcomputer that includes a CPU and the like.

A system power supply circuit 112 is a circuit to generate power to be supplied to each circuit of the first imaging apparatus 200, using power supplied from the power supply 111. The system power supply circuit 112 includes a DC/DC convertor circuit, a low drop out (LDO), a charge pump circuit, and the like. Camera microcomputer voltage VMCU_C (1.8V voltage) generated by the system power supply circuit 112 is constantly supplied to the camera control circuit 40. By controlling the system power supply circuit 112, the camera control circuit 40 controls the power ON/OFF supplied to each composing element of the first imaging apparatus 200. The system power supply circuit 112 includes the power supply type detection circuit 33, the power supply state detection circuit 34 and the power supply control circuit 35.

The lens unit 100 is "removable" from the first imaging apparatus 200 (can be attached to and detached from the first imaging apparatus 200). The light which entered via the lens unit 100 (light from the subject) forms an image on the image pickup element 20. The subject image formed on the image pickup element 20 is converted (encoded) into digital imaging signals.

The image processing circuit 23 performs image processing (e.g. noise reduction processing, white balance processing) on the digital imaging signals acquired by the image pickup element 20, so as to generate the image data. The image processing circuit 23 converts the generated image data into an image file in JPEG format or the like, in order to be recordable in the recording medium 28. The image processing circuit 23 also generates VRAM image data to be displayed on the liquid crystal display unit 25.

The memory controller 27 controls the transmission/reception of the image data generated by the image processing circuit 23 or the like and other data. The volatile memory 39 is a memory that can perform high-speed reading and writing, such as DDR 3SDRAM. The volatile memory 39 is used as a work memory for image processing performed by the image processing circuit 23. The recording medium 28 is a recording medium that can be read or written to via the external interface 29 (see FIG. 1) (e.g. SD card or CFexpress card removable from the first imaging apparatus 200).

The liquid crystal display unit 25 is a display disposed on the rear face of the first imaging apparatus 200. A backlight circuit 128 adjusts the brightness of the liquid crystal display unit 25 by changing the light quantity of the backlight of the liquid crystal display unit 25.

An accessory power supply circuit A131 and an accessory power supply circuit B132 are power supply units. The accessory power supply circuit A131 and the accessory power supply circuit B132 are voltage conversion units (voltage conversion circuits) to convert the voltage supplied from the system power supply circuit 112 into a predetermined voltage respectively. In the present embodiment, the accessory power supply circuit A131 and the accessory power supply circuit B132 generate accessory voltage VACC (3.3V voltage) respectively.

The accessory power supply circuit A131 is a power supply circuit that is constituted of an LDO and the like, and has low self-power consumption. The accessory power supply circuit B132 is a circuit that is constituted of a DC/DC convertor circuit and the like, and can supply current higher than the accessory power supply circuit A131. The self-power consumption of the accessory power supply circuit B132 is higher than that of the accessory power supply circuit A131.

In a case where the load current (current supplied to the accessory 500) is low, the power loss caused by voltage conversion is lower (conversion efficiency is better) in the accessory power supply circuit A131 than in the accessory power supply circuit B132. In a case where the load current is high, on the other hand, the power loss caused by the voltage conversion is less in the accessory power supply circuit B132 than in the accessory power supply circuit A131. Therefore the camera control circuit 40 controls the ON/OFF of the output of the accessory power supply circuit A131 and the accessory power supply circuit B132 in accordance with the operation state of the accessory 500.

A protective circuit 133 includes a current fuse element, a poly-switch element, an electronic fuse circuit (circuit combining a resistor, amplifier and switch element), and the like. In a case where the power supply current value supplied from the accessory power supply circuit A131 or the accessory power supply circuit B132 to the accessory 500 exceeds a predetermined value, the protective circuit 133 outputs an overcurrent detection signal DET_OVC of which signal level is the high level. In the present embodiment, the protective circuit 133 is assumed to be an electronic fuse circuit. Further, in the present embodiment, the protective circuit 133 notifies the generation of an overcurrent to the camera control circuit 40 by the overcurrent detection signal DET_OVC in a case where 1A or higher current is supplied from the accessory power supply circuit A131 or the accessory power supply circuit B132.

The camera connection unit 141 is a connector to electrically connect to the accessory 500 via 21 contacts TC01 to TC21 arrayed in a line. The contacts TC01 to TC21 are disposed in this order from one end to the other end in the array direction.

The contact TC01 is connected to the ground (GND). The contact TC01 is not only a contact of the reference potential (GND potential), but also plays a role of a contact to control the wiring impedance of a differential signal D1N and a differential signal D1P.

The differential signal D1N that flows through the contact TC02 and the differential signal D1P that flows through the contact TC03 are differential data communication signals that form a pair, and perform data communication as a pair. The differential signal D1N and the differential signal D1P are inputted to the camera control circuit 40 or are outputted from the camera control circuit 40. The contacts TC02, TC03, TC07 to TC17, TC19 and TC20 are communication contacts which are used for the first imaging apparatus 200 to communicate with the accessory 500.

The contact TC04 is connected to the ground (GND), and is a contact of the reference potential of the first imaging apparatus 200 and the accessory 500. The contact TC04 is disposed so that the distance between the contact TC04 and the contact TC01 (edge of the array of the contacts) is shorter than the distance between the contact TC05 and the contact TC01.

The contact TC05 is a power supply contact connected to the power supply 111. The accessory voltage VACC, which is generated by the accessory power supply circuits A131 and B132, is supplied to the contact TC05 via the protective circuit 133.

The contact TC06 transfers an accessory attachment detection signal/ACC_DET. The accessory attachment detection signal/ACC_DET is pulled up to a camera microcomputer voltage VMCU_C via a resistance element Rp134 (resistance of 10 kΩ). By reading the signal level of the accessory attachment detection signal/ACC_DET, the camera control circuit 40 can detect whether or not the accessory 500 is attached.

If the signal level (potential) of the accessory attachment detection signal/ACC_DET is high level (predetermined potential), the camera control circuit 40 detects that the accessory 500 is not attached to the first imaging apparatus 200. If the signal level (potential) of the accessory attachment detection signal/ACC_DET is low level (GND potential), the camera control circuit 40 detects that the accessory 500 is attached to the first imaging apparatus 200.

The contact TC07 transfers a signal SCLK, and the contact TC08 transfers a signal MOSI. The contact TC09 transfers a signal MISO, and the contact TC10 transfers a signal CS. The signal SCLK, the signal MOSI, the signal MISO and the signal CS are signals for the camera control circuit 40 to perform the serial peripheral interface (SPI) communication as a communication master (master in a master-slave relationship). In the present embodiment, the communication clock frequency of the SPI communication is assumed to be 1 MHz.

The contact TC11 transfers a communication request signal/WAKE to request communication from the accessory 500 to the camera control circuit 40. The communication request signal/WAKE is pulled up to the camera microcomputer voltage VMCU_C via a resistor. By detecting the fall edge of the communication request signal/WAKE, the camera control circuit 40 can receive the communication request from the accessory 500.

The contact TC12 transfers a signal SDA, and the contact TC13 transfers a signal SCL. The signal SDA and the signal SCL are signals for the camera control circuit 40 to perform the inter-integrated circuit (I2C) communication as a communication master. The signal SDA and the signal SCL are pulled up to the camera microcomputer voltage VMCU_C, and are signals for communication in the open-drain method (hereafter "open-drain communication"). In the present embodiment, the communication frequency of the open-drain communication is assumed to be 100 kbps.

The contact TC14 (synchronous contact) transfers a signal FNC1, and the contact TC15 transfers a signal FNC2. The contact TC16 transfers a signal FNC3, and the contact TC17 transfers a signal FNC4. The types of the signals FNC1 to FNC4 (functional signals) change in accordance with the type of the accessory 500 attached to the first imaging apparatus 200. For example, the signals FNC1 to FNC4 are sound data signals if the accessory 500 is a microphone apparatus. The signals FNC1 to FNC4 are signals to control a timing of the light emission if the accessory 500 is an illumination (stroboscope or flash) apparatus. Furthermore, the signals FNC1 to FNC4 are signals to control image capturing using a camera unit of a smartphone if the accessory 500 is a smartphone holder (accessory for connecting the imaging apparatus). Therefore the contacts TC14 to TC17 can be regarded as functional signal contacts.

The contact TC18 is connected to the ground (GND). Just like the contact TC04, the contact TC18 is a contact of the reference potential of the first imaging apparatus 200 and the accessory 500.

The contact TC19 transfers a differential signal D2N, and the contact TC20 transfers a differential signal D2P. The differential signal D2N and the differential signal D2P are data communication signals that form a pair and perform data communication as a pair, and are inputted to the camera control circuit 40 or are outputted from the camera control circuit 40.

The contact TC21 is connected to the ground (GND). The contact TC21 is not only a contact of the reference potential, but also plays a role of a contact to control the wiring impedance of the differential signal D2N and the differential signal D2P.

In the present embodiment, the contact TC06 to transfer the accessory attachment detection signal/ACC_DET is disposed next to the contact TC07 to transfer the signal SCLK, which is a clock signal. Normally noise due to the potential changes of the clock signal (clock noise) is transferred to a contact adjacent to the contact of the clock signal, and this becomes a cause of the malfunction of the apparatus. This influence is especially major in the case of such a configuration as the present embodiment, where many contacts exist and a distance between contacts is short.

Here the accessory attachment detection signal/ACC_DET is pulled up before the accessory 500 is attached to the first imaging apparatus 200, but is set to the GND potential after the accessory 500 is attached. On the other hand, the contact TC07 does not transfer a clock signal before the accessory 500 is attached, hence the potential does not change. In other words, the contact TC07 transfers a clock signal only after the accessory is attached, hence the potential changes only after the accessory is attached.

On the other hand, when the contact TC07 (SCLK contact) transfers the clock signal, the potential of the contact TC06 (attachment detection contact) becomes the GND potential. Therefore even if the contact TC06 at the GND potential receives clock noise, the potential of the control circuits of the first imaging apparatus 200 and the accessory 500 do not change very much. In other words, a malfunction is not generated very easily in the first imaging apparatus 200 and the accessory 500. Furthermore, the transfer of clock noise to the contact TC05 or the like (positions more distant from the contact TC06 viewed from the contact TC07) can be suppressed, since the contact TC06 exists.

Therefore by disposing the contact TC06, which transfers the accessory attachment detection signal/ACC_DET, next to the contact TC07, which transfers the signal SCLK, the influence of the clock noise can be suppressed. Further, it is not necessary to dispose a GND contact (GND terminal) between the contact TC06 and the contact TC07, hence the influence of the clock noise can be suppressed without increasing the number of contacts.

The signal SCL, which is a clock signal (second clock signal), is also transferred to the contact TC13 (second clock contact). However, the frequency of the signal SCLK transferred to the contact TC07 is higher than the signal SCL, hence more clock noise is generated from the contact TC07 than from the contact TC13. Therefore the effect to prevent a malfunction of the apparatus caused by the clock noise is greater when the contact TC06 is disposed next to the contact TC07, instead of next to the contact TC13.

Furthermore, the signal SCL transferred to the contact TC13 is a clock signal conforming to the I2C communication standard, and is driven by the open-drain method. The signal SCLK transferred to the contact TC07, on the other hand, is a clock signal conforming to the SPI communication standard, and is driven by the CMOS output. Therefore in the case of the contact TC13, the edge of the changes of the voltage is gentler and less clock noise is generated compared with the case of the contact TC07. From this point of view as well, the effect to prevent a malfunction of the apparatus caused by the clock noise is greater when the contact TC06 is disposed next to the contact TC07, instead of next to the contact TC13.

In the contacts TC19 and TC20 as well, the clock signal may be transferred using the differential signals DIN and DIP, which are pair signals. In this case, in the contacts TC19 and TC20, a clock signal (third clock signal) of which frequency is higher than the clock signal transferred to the contact TC07 and the contact TC13 may be transferred. However, the differential signals DIN and DIP are pair signals, hence the radiation of clock noise is less compared with the contact TC07 and the contact TC13 which transfer a signal end signal. Therefore the effect to prevent a malfunction of the apparatus caused by clock noise is greater when the contact TC06 is disposed next to the contact TC07, instead of next to the contact TC19 or TC20.

The contact TC08 (first data contact) disposed next to the contact TC07 on the opposite side of the contact TC06 transfers a signal MOSI (first data signal). The signal MOSI, which is a data signal, seems to be easily influenced by the clock noise. However, the signal MOSI is a data signal conforming to the SPI communication standard, which is the same as the clock signal transferred by the contact TC07. Therefore, the timing of the potential change in the signal MOSI is synchronized with the clock signal, and is not influenced by the clock noise very much. Hence the contact TC08 can be used without being fixed to the GND potential.

Configuration of Accessory 500

The accessory 500 includes a battery 505. The accessory 500 receives power supplied from the battery 505, and also receives power supplied from the first imaging apparatus 200 via the camera connection unit 141 and the accessory connection unit 511.

An accessory control circuit 501 is a control unit of the accessory 500, and is a circuit to control the accessory 500 in general. The accessory control circuit 501 is a microcomputer which includes a CPU and the like.

An accessory power supply circuit 502 is a circuit to generate power to be supplied to each circuit of the accessory 500. The accessory power supply circuit 502 includes a DC/DC convertor circuit, an LDO, a charge pump circuit, and the like. An accessory microcomputer voltage VMCU_A (1.8V voltage) generated by the accessory power supply circuit 502 is constantly supplied to the accessory control circuit 501. By controlling the accessory power supply circuit 502, the accessory control circuit 501 can control the power ON/OFF supplied to each circuit of the accessory 500.

A power switch 503 is a switch to switch the operation of the accessory 500 ON/OFF. The accessory control circuit 501 can detect the state (ON position or OFF position) of the power switch 503 by reading the signal level of the terminal to which the power switch 503 is connected.

A charging circuit 504 is a circuit to charge the battery 505 using the power supplied from the first imaging apparatus 200. If it can be determined that sufficient power to perform the charging operation is being supplied from the first imaging apparatus 200, the accessory control circuit 501 controls the charging circuit 504 to charge the battery 505. In the description of the present embodiment, the battery 505 is attached to the accessory 500, but the accessory 500 may be operated by the power supplied from the first imaging apparatus 200 alone, without attaching the battery 505. In this case, the accessory 500 need not include the charging circuit 504.

A differential communication circuit 507 is a circuit to perform differential communication with the first imaging apparatus 200. The differential communication circuit 507 can perform transmission/reception of data with the first imaging apparatus 200.

An external communication IF circuit 508 is an interface circuit to perform data communication with an external apparatus. The external communication IF circuit 508 is an interface to perform communication using Ethernet, wireless LAN, or a public network. By controlling the differential communication circuit 507 and the external communication IF circuit 508, the accessory control circuit 501 implements communication with the first imaging apparatus 200 and an external apparatus. The accessory control circuit 501 can, for example, transmit data received from the first imaging apparatus 200 to an external apparatus, and transmit data received from an external apparatus to the first imaging apparatus 200. A functional circuit 506 is a circuit to have a different function depending on the type of the accessory 500.

An external connection terminal 509 is a connector terminal to connect with an external apparatus. The external connection terminal 509 is a USB TYPE-C connector in the present embodiment. A connection detection circuit 510 is a circuit to detect that an external apparatus is connected to the external connection terminal 509. The accessory control circuit 501 can detect the connection of an external apparatus to the external connection terminal 509 by receiving an output signal from the connection detection circuit 510.

For example, the accessory 500 can communicate with the second imaging apparatus 300 via the external communication IF circuit 508 or the external connection terminal 509. Therefore depending on the type of the accessory 500, the accessory 500 can relay communication between the first imaging apparatus 200 and the second imaging apparatus 300.

The accessory connection unit 511 is a connector to electrically connect to the first imaging apparatus 200 via the 21 contacts TA01 to TA21 arrayed in a line. The contacts TA01 to TA21 are disposed in this order from one end to the other end in the array direction.

The contact TA01 is connected to the ground (GND). The contact TA01 is not only a contact of the reference potential (GND potential), but also plays a role of a contact to control the wiring impedance of the differential signal D1N and the differential signal D1P.

The differential signal D1N that flows through the contact TA02 and the differential signal D1P that flows through the contact TA03 are data communication signals that form a pair, and perform data communication as a pair. The differential signal D1N and the differential signal D1P are inputted to the differential communication circuit 507 or outputted from the differential communication circuit 507. The contacts TA02, TA03, TA07 to TA17, TA19 and TA20 are communication contacts which are used for the accessory 500 to communicate with the first imaging apparatus 200.

The contact TA04 is connected to the ground (GND), and is a contact of the reference potential of the first imaging apparatus 200 and the accessory 500. The contact TA04 is disposed so that the distance between the contact TA04 and the contact TA01 (edge of the array of the contacts) is shorter than the distance between the contact TA05 and the contact TA01.

The contact TA05 is a power supply contact connected to the accessory power supply circuit 502 and the charging circuit 504. The accessory voltage VACC (power of the accessory voltage VACC) is supplied to the contact TA05 from the first imaging apparatus 200.

The contact TA06 is connected to the ground (GND). If the accessory 500 is attached to the first imaging apparatus 200, the accessory attachment detection signal/ACC_DET signal level is set to low level (GND level) because of the contact TA06. Thereby the first imaging apparatus 200 (camera control circuit 40) can detect that the accessory 500 is attached.

The contact TA07 transfers the signal SCLK, and the contact TA08 transfers the signal MOSI. The contact TA09 transfers the signal MISO, and the contact TA10 transfers the signal CS. The signal SCLK, the signal MOSI, the signal MISO and the signal CS are signals for the accessory control circuit 501 to perform the SPI communication as a communication slave (slave in the master-slave relationship).

The contact TA11 transfers the communication request signal/WAKE to request communication from the accessory control circuit 501 to the first imaging apparatus 200. If it is determined that the communication with the first imaging apparatus 200 is necessary, the accessory control circuit 501 requests communication to the first imaging apparatus 200 by outputting the communication request signal/WAKE at low level.

The contact TA12 transfers the signal SDA, and the contact TA13 transfers the signal SCL. The signal SDA and the signal SCL are signals for the accessory control circuit 501 to perform the I2C communication as a communication slave.

The contact TA14 (synchronous contact) transfers the signal FNC1, and the contact TA15 transfers the signal FNC2. The contact TA16 transfers the signal FNC3, and the contact TA17 transfers the signal FNC4. As mentioned above, the types of the signals FNC1 to FNC4 (functional signals) change in accordance with the type of the accessory 500. This means that the contacts TA14 to TA17 are regarded as functional signal contacts. The signals FNC1 to FNC4 are inputted to the functional circuit 506 or are outputted from the functional circuit 506.

The contact TA18 is connected to the ground (GND). Just like the contact TA04, the contact TA18 is a contact of the reference potential of the first imaging apparatus 200 and the accessory 500.

The contact TA19 transfers the differential signal D2N, and the contact TA20 transfers the differential signal D2P. The differential signal D2N and the differential signal D2P are data communication signals that form a pair, and perform data communication as a pair. The differential signal D2N and the differential signal D2P are inputted to the external connection terminal 509, or are outputted from the external connection terminal 509.

The contact TA21 is connected to the ground (GND). The contact TA21 is not only a contact of the reference potential, but also plays a role of a terminal to control the wiring impedance of the differential signal D2N and the differential signal D2P.

Image Capturing System

Figure 6:
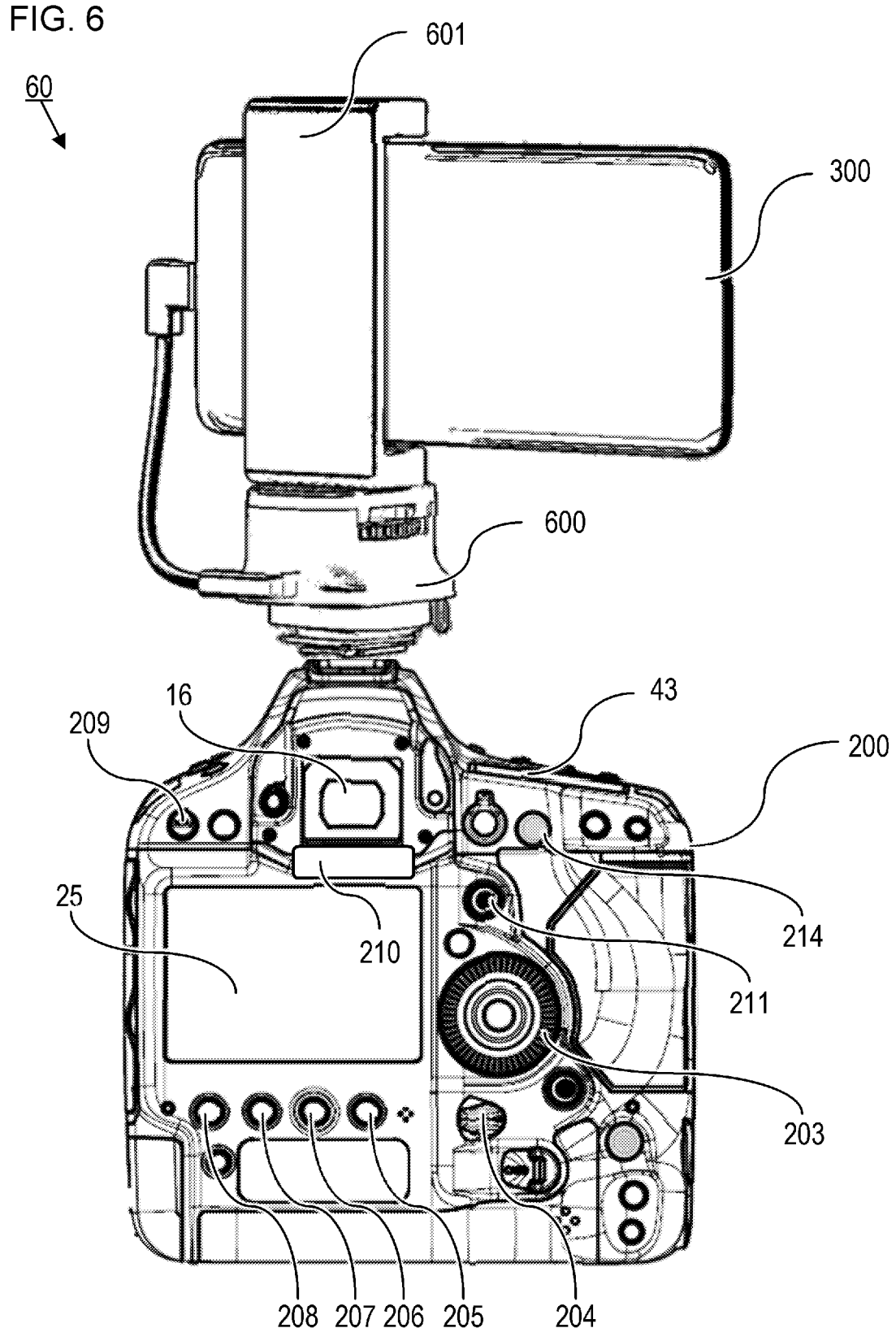
FIG. 6 is an external view of an image capturing system.

FIG. 6 is an external view of an image capturing system 60. The image capturing system 60 includes the first imaging apparatus 200, the second imaging apparatus 300 and a communication accessory 600. The communication accessory 600 is a type of the accessory 500, and the first imaging apparatus 200 and the second imaging apparatus 300 can communicate with each other via the communication accessory 600. The communication accessory 600 can be a smartphone holder that holds the second imaging apparatus 300, which is a smartphone.

An operation unit 70 of the first imaging apparatus 200 includes a sub-electronic dial 203, a power switch 204, a protect button 205, a delete button 206 and a magnifying mode button 207. The operation unit 70 also includes a reproduction instruction button 208, a menu button 209, a multi-controller 211, and an auto focus start button 214.

The sub-electronic dial 203 is a rotational operation member. By turning the sub-electronic dial 203, the user sets such set values as aperture and exposure correction, and feeds images one-by-one in the image display state.

The power switch 204 is an operation member to switch the power supply ON/OFF. The protect button 205 is a button to perform such processing as protecting and rating an image stored in the internal storage of the first imaging apparatus 200 or an external recording medium.

The delete button 206 is a button to instruct delete of an image stored in the internal storage of the first imaging apparatus 200 or an external recording medium. The magnifying mode button 207 is a button to receive an operation to instruct transition to the magnifying mode (magnifying mode start instruction), or operation to instruct exit from the magnifying mode (magnifying mode end instruction) in the reproducing state.

The reproduction instruction button 208 is a button to display an image, stored in the internal storage of the first imaging apparatus 200 or an external recording medium, on the liquid crystal display unit 25. The menu button 209 is a button to display various setting screens on the liquid crystal display unit 25.

An eye contact detection unit 210 is a sensor to detect whether the user is looking into the finder 16 or not. Herein below, the "eye contact state" refers to the state where the user is looking into the finder 16, and the eye of the user is in contact with the finder 16.

The multi-controller 211 is an operation member to set a distance measurement point, which is a start point of auto focus, or to move a magnifying frame (magnified range) in the magnified image display state. By using the multi-controller 211, the user can move the distance measurement point or the magnifying frame to any of a plurality of directions.

The auto focus start button 214 is an operation member to instruct start of auto focus.

The communication accessory 600 is an accessory to relay communication between the first imaging apparatus 200 and the second imaging apparatus 300. The communication accessory 600 relays an image capturing request from the first imaging apparatus 200 to the second imaging apparatus 300. The first imaging apparatus 200 can detect that the second imaging apparatus 300 is connected and perform transmission/reception of signals indicating various requests, such as an image capturing request to the second imaging apparatus, via the communication accessory 600. By performing various requests to the second imaging apparatus 300, the first imaging apparatus 200 can control the operation of the second imaging apparatus 300.

The holder 601 included in the communication accessory 600 is a member to fix the second imaging apparatus 300. The first imaging apparatus 200 and the second imaging apparatus 300 are integrally fixed to each other by the holder 601. Thereby the user holding the first imaging apparatus 200 can fix the orientation of the second imaging apparatus 300 without holding the second imaging apparatus 300. In the state where the first imaging apparatus 200 and the second imaging apparatus 300 are connected via the communication accessory 600, if the orientation of the first imaging apparatus 200 changes, the orientation of the second imaging apparatus 300 changes in accordance with the change of the orientation of the first imaging apparatus 200. In the present embodiment, the second imaging apparatus 300 is fixed to the upper surface of the first imaging apparatus 200. In the present embodiment, assuming that the user looks at the first imaging apparatus 200 or the second imaging apparatus 300 that is used for the imaging capturing processing, a control to switch between the imaging apparatuses to be used for the image capturing processing is performed, depending on whether the position of the eye of the user satisfies predetermined conditions.

Image Capturing Processing of Imaging System

Figure 7:
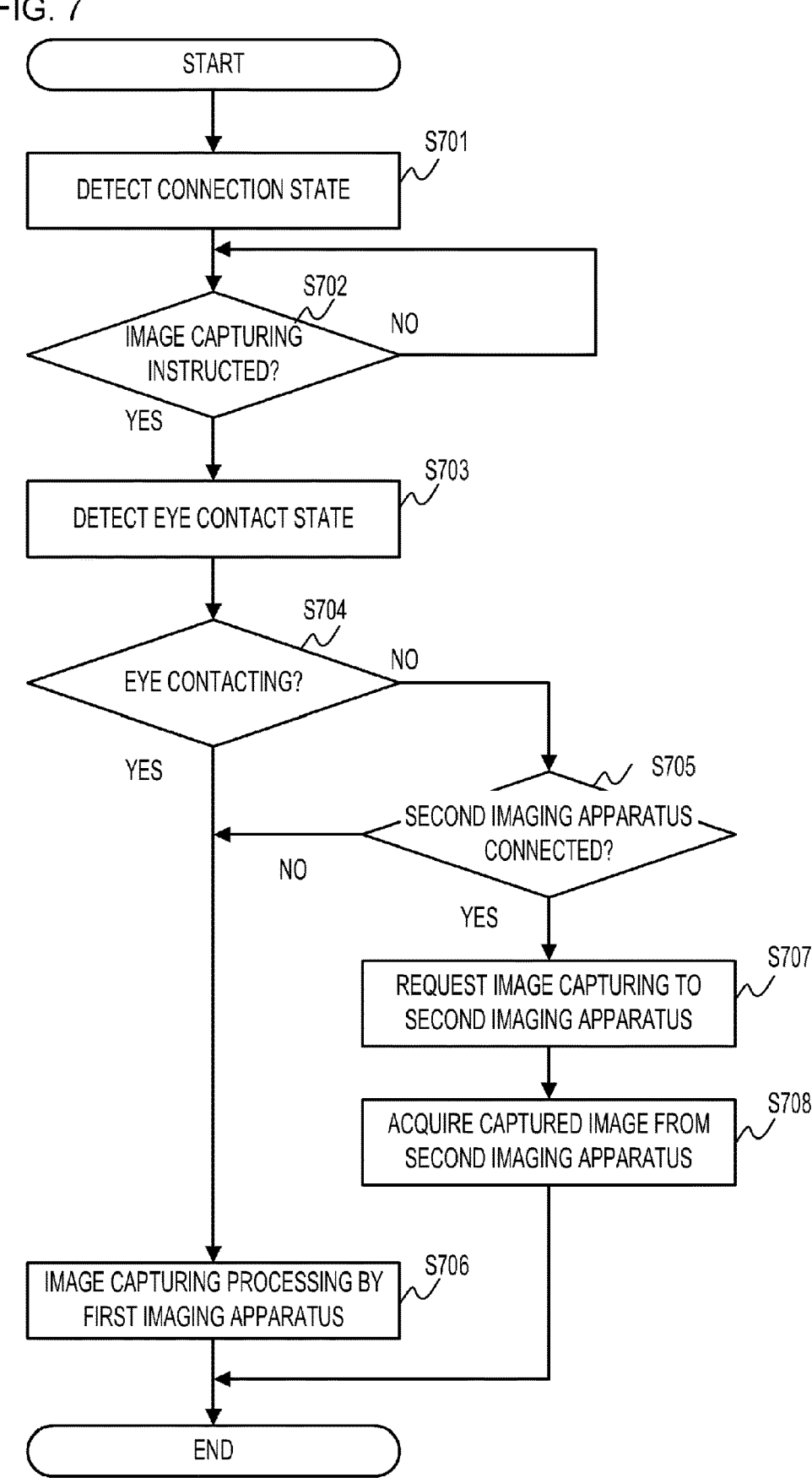
FIG. 7 is a flow chart depicting processing of the first imaging apparatus.
Figure 8:
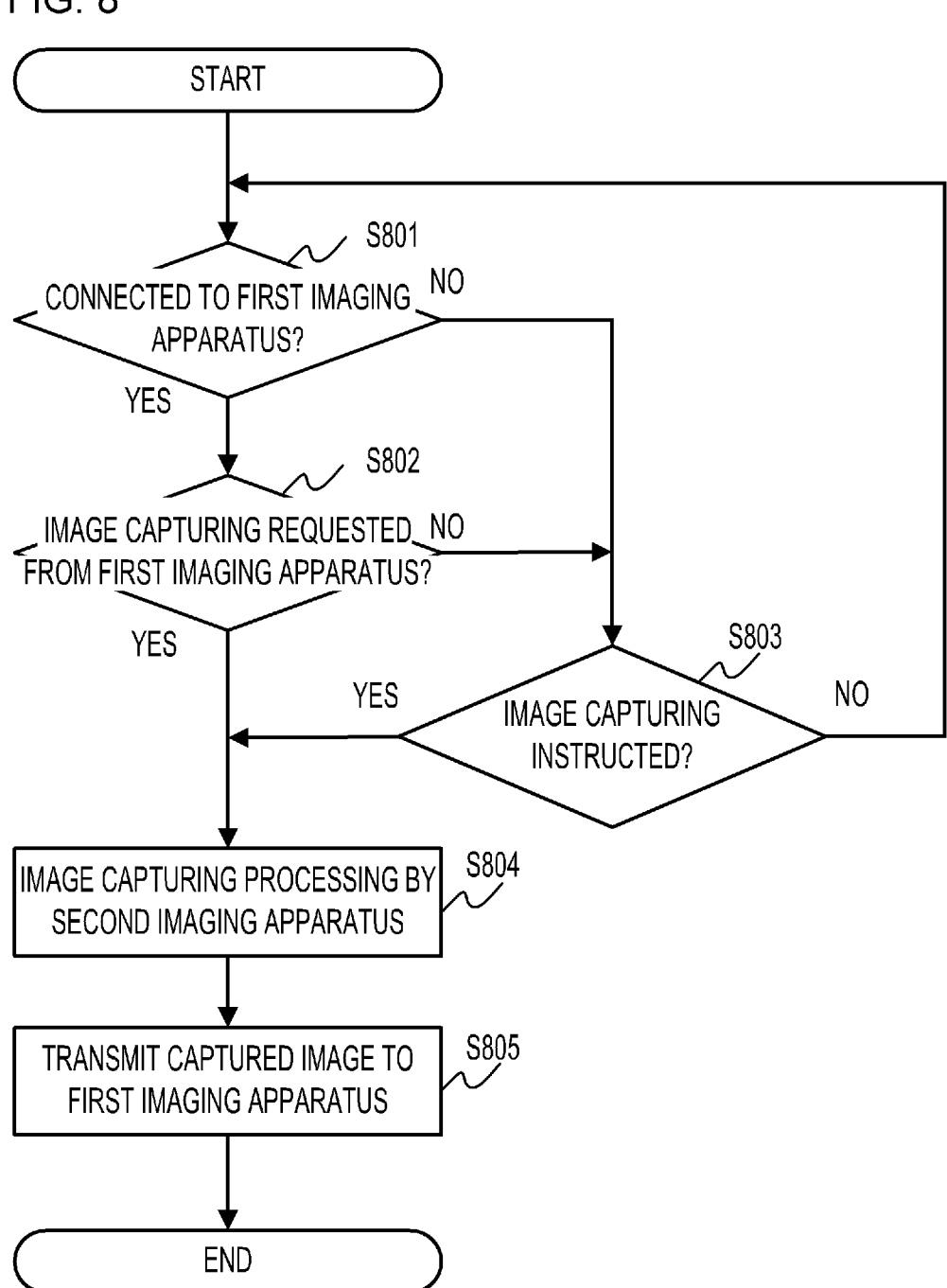
FIG. 8 is a flow chart depicting processing of the second imaging apparatus.

The image capturing processing (image capturing method; control method) by the image capturing system 60 will be described with reference to the flow charts in FIG. 7 and FIG. 8. In the following, the image capturing processing by the image capturing system 60 will be described based on the assumption that an angle-of-view of an image acquired in the image capturing processing (imaging) by the first imaging apparatus 200 (image pickup element 20) is different from the angle-of-view of an image acquired in the image capturing processing by the second imaging apparatus 300. As mentioned above, the second imaging apparatus 300 includes the telescopic out-camera 314a, the standard out-camera 314b and the wide angle out-camera 314c, which are lens units (out-cameras) different from each other. The user (image taker) can select (switch to) a lens unit to be used for image capturing by the second imaging apparatus 300 out of the three lens units.

Processing of First Imaging Apparatus

The processing (control method) of the first imaging apparatus 200 will be described first with reference to FIG. 7. According to the flow chart in FIG. 7, processing starts when the power switch 204 is pressed and the power of the first imaging apparatus 200 is turned ON. The processing in the flow chart in FIG. 7 is implemented by the camera control circuit 40 developing a program, which is recorded in the non-volatile memory 38, in the volatile memory 39, and executing the program. Even if the processing in the flow chart in FIG. 7 ends, the processing in the flow chart in FIG. 7 starts again if the power of the first imaging apparatus 200 is ON.

In step S701, the camera control circuit 40 detects information on the connection state of the second imaging apparatus 300 (information on whether the second imaging apparatus 300 and the first imaging apparatus 200 are connected) via the communication accessory 600.

In step S702, the camera control circuit 40 determines whether an image capturing instruction is acquired from the user. When the release button 201 is pressed, the camera control circuit 40 (operation unit 70) acquires the image capturing instruction from the user. Processing advances to step S703 if it is determined that the image capturing instruction is acquired. The processing in step S702 is repeated if it is determined that the image capturing instruction is not acquired.

In step S703, the camera control circuit 40 controls the eye contact detection unit 210, and detects the eye contact state (state whether or not the user (image taker) is looking into the finder 16) of the user.

In step S704, the camera control circuit 40 determines whether the eye of the user is contacting the finder 16 (whether the user is looking into the finder 16) based on the eye contact state detected in step S703. Processing advances to step S706 if it is determined that the eye of the user is contacting the finder 16. Processing advances to step S705 if it is determined that the eye of the user is not contacting the finder 16 (the eye disengages from the finder 16).

In step S705, the camera control circuit 40 determines whether the second imaging apparatus 300 and the first imaging apparatus 200 are connected or not based on the connection state of the second imaging apparatus 300 detected in step S701. Processing advances to step S707 if it is determined that the second imaging apparatus 300 and the first imaging apparatus 200 are connected. Processing advances to step S706 if it is determined that the second imaging apparatus 300 and the first imaging apparatus 200 are not connected. In the present embodiment, the state where the second imaging apparatus 300 and the first imaging apparatus 200 are connected refers to the state where the second imaging apparatus 300 and the first imaging apparatus 200 are communicable via the communication accessory 600.

In step S706, the camera control circuit 40 performs the image capturing processing by the first imaging apparatus 200 by controlling the image pickup element 20. Specifically, the camera control circuit 40 acquires the captured image by performing imaging using the image pickup element 20, and records the captured image in the recording medium 28 or the like.

In step S707, the camera control circuit 40 requests image capturing to the second imaging apparatus 300 via the communication accessory 600. The camera control circuit

40 controls the second imaging apparatus 300 to perform the image capturing processing, by requesting image capturing to the second imaging apparatus 300.

In step S708, the camera control circuit 40 acquires the captured image from the second imaging apparatus 300 (captured image acquired by the image capturing processing performed by the second imaging apparatus 300). Further, the camera control circuit 40 records the captured image acquired from the second imaging apparatus 300 in the recording medium 28 or the like. The processing in step S708 may be omitted as long as the captured image acquired by the image capturing processing performed by the second imaging apparatus 300 is recorded in the recording medium 308.

Processing of Second Imaging Apparatus

The processing of the second imaging apparatus 300 will be described next with reference to the flow chart in FIG. 8. According to the flow chart, processing starts when the power button 306b is pressed and the power of the second imaging apparatus 300 is turned ON. The processing in the flow chart in FIG. 8 is implemented by the CPU 301 developing a program, which is recorded in the non-volatile memory 303, in the memory 302, and executing the program. Even if the processing in the flow chart in FIG. 8 ends, the processing in the flow chart in FIG. 8 starts again if the power of the second imaging apparatus 300 is ON.

In step S801, the CPU 301 determines whether the second imaging apparatus 300 and the first imaging apparatus 200 are connected via the communication accessory 600. Processing advances to step S802 if it is determined that the second imaging apparatus 300 and the first imaging apparatus 200 are connected. Processing advances to step S803 if it is determined that the second imaging apparatus 300 and the first imaging apparatus 200 are not connected. For example, the CPU 301 determines whether the second imaging apparatus 300 and the first imaging apparatus 200 are connected by detecting the connecting state with the first imaging apparatus 200, just like step S701. The CPU 301 may also determine whether the second imaging apparatus 300 and the first imaging apparatus 200 are connected by detecting whether a signal related to the image capturing has been received from the communication accessory 600.

In step S802, the CPU 301 determines whether an image capturing request is received from the first imaging apparatus 200. Processing advances to step S804 if the image capturing request is received. Processing advances to step S803 if the image capturing request is not received. In a case where the second imaging apparatus 300 and the first imaging apparatus 200 are not connected, the image capturing request is not received from the first imaging apparatus 200. Therefore in this case, processing advances from step S802 to step S803 even if the processing in step S801 is omitted. Hence the processing in step S802 may be performed omitting the processing in step S801.

In step S803, the CPU 301 determines whether an image capturing instruction is received in accordance with the user operation on the touch panel 306a. Processing advances to step S804 if it is determined that the image capturing instruction is received. Processing advances to step S801 if it is determined that the image capturing instruction is not received.

In step S804, the CPU 301 performs the image capturing processing in the second imaging apparatus 300. Specifically, a subject is captured using at least one of the telescopic out-camera 314a, the standard out-camera 314b and the wide angle out-camera 314*c*. The captured image, which was acquired by imaging the subject, is recorded in the memory 302.

In step S805, the CPU 301 transmits the captured image acquired in step S804 to the first imaging apparatus 200. In the case where the first imaging apparatus 200 and the second imaging apparatus 300 are not connected, the CPU 301 does not transmit the captured image to the first imaging apparatus 200.

In the case where the user (image taker) instructs image capturing in a state of looking into the finder 16, the image capturing is performed by the first imaging apparatus 200. In the case where the user instructs image capturing in a state of not looking into the finder 16, the image capturing is performed by the second imaging apparatus 300. Therefore the user can acquire images (photographs) at a plurality of angle-of-views without switching the imaging apparatus to be held from one hand to the other, by, for example, installing a telephoto lens in the first imaging apparatus 200 and installing a wide angle lens in the second imaging apparatus 300. This means that the user can capture images with less stress than conventional image capturing. Further, the user can capture images using the second imaging apparatus 300 without operating the second imaging apparatus 300. This prevents such a state where force required for operation is applied to the second imaging apparatus 300, and the orientation of the second imaging apparatus 300 changes during the image capturing. In other words, it is prevented to acquire an image in a composition unintended by the user. Furthermore, looking into the finder 16 is normal during the image capturing, hence an image can be captured using the imaging apparatus intended by the user, without adding any new operation to what is originally required to capturing images.

Further, the first imaging apparatus 200 captures an image while the user is looking into the finder 16, hence the user looking into the finder 16 can capture an image while checking an image to be captured by the first imaging apparatus 200. On the other hand, the second imaging apparatus 300 captures an image when the user is not looking into the finder 16, hence the user can capture an image using the second imaging apparatus 300 while checking the LV image displayed on the display 305, for example. Therefore suitable images can be acquired regardless which one of the first imaging apparatus 200 and the second imaging apparatus 300 is used to capture an image.

Instead of the release button 201, the first imaging apparatus 200 may acquire an image capturing instruction by user operation on the touch panel disposed on the liquid crystal display unit 25. In a case where it is determined that the image capturing instruction performed by user operation on the touch panel is acquired in step S702, processing may advance to step S706 without performing the processing in step S703 and step S704. In other words, in the case where it is determined that the image capturing instruction performed by user operation on the touch panel is acquired in step S702, the image capturing processing by the first imaging apparatus 200 may be executed regardless the eye contact state to the finder 16.

In the present embodiment, switching between the first imaging apparatus 200 (image pickup element 20) capturing an image or the second imaging apparatus 300 capturing an image is determined depending on whether the eye of the user is contacting the finder 16 or not in step S704. However, the present invention is not limited to this, and the camera control circuit 40 may switch the imaging apparatus to be used for image capturing depending on whether the user is pressing a predetermined button, for example. In this case, processing advances to step S706 if it is determined that the predetermined button is pressed in step S704, or advances to step S705 if it is determined that the predetermined button is not pressed in step S704.

The camera control circuit 40 may switch the imaging apparatus to be used for image capturing in accordance with the distance between a predetermined body part (face, eye or forehead) of the user and the first imaging apparatus 200 measured by a distance measuring unit (not illustrated) of the first imaging apparatus 200. In this case, processing advances to step S706 if it is determined in step S704 that the distance between the predetermined body part of the user and the first imaging apparatus 200 is shorter than a predetermined value, or advances to step S705 if it is determined that this distance is the predetermined value or more. Here in the case where the distance between the predetermined body part of the user and the first imaging apparatus 200 is short, it is more likely that the user is preparing to capture an image using the first imaging apparatus 200 by checking the settings for image capturing, or looking into the finder 16, for example. That is, the intention of the user is more likely to capture an image using the first imaging apparatus 200. In other words, by controlling the imaging apparatus to be used for image capturing like this, an image can be captured using the imaging apparatus intended by the user.

Further, the camera control circuit 40 may switch an imaging apparatus to be used for image capturing depending on whether the user is looking at the display unit (outer finder liquid crystal display unit 43, inner finder liquid crystal display unit 41, or liquid crystal display unit 25). The position at which the user is looking (or whether the user is looking at the display unit or not) can be detected by a line-of-sight detection unit (not illustrated) of the first imaging apparatus 200. In this case, the position of the line-of-sight (viewed position) of the user is detected on the screen of the display unit in step S704, and processing advances to step S706 if it is determined that the user is looking at the display unit, or advances to step S705 if it is determined that the user is not looking at the display unit. Here in the case where the user is looking at the display unit, it is more likely that the user is checking an LV image, composition and setting of image capturing, or the like, of the first imaging apparatus 200 via the display on the display unit. That is, the intention of the user is more likely to capture an image using the first imaging apparatus 200. In other words, by controlling the imaging apparatus to be used for image capturing like this, an image can be captured using the imaging apparatus intended by the user.

Processing may advance to S706 in one of the following cases in step S704: the eye of the user is contacting the finder 16; the predetermined button is pressed; the distance between the user and the first imaging apparatus 200 is shorter than the predetermined value; and the user is looking at the display unit. Processing may advance to S705 if none of these four cases are applicable. Processing may advance to S706 if at least two cases, out of these four cases, are applicable.

In the image capturing system 60, the first imaging apparatus 200 and the second imaging apparatus 300 are connected via the communication accessory 600, but may be directly connected without the communication accessory 600. Further, the first imaging apparatus 200 may acquire an LV image from the second imaging apparatus 300, and display the LV image of the second imaging apparatus 300 on the liquid crystal display unit 25. Then the user can check the composition by looking into the finder 16, in the case of capturing an image using the first imaging apparatus 200, and check the composition by looking at the liquid crystal display unit 25, in the case of capturing an image using the second imaging apparatus 300.

According to the present invention, the user can capture an image using a plurality of imaging apparatuses, without switching the imaging apparatuses from one hand to the other.

Although preferred embodiments have been described, the present invention is not limited to these embodiments, and various modifications and changes are possible within the scope of the spirit thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-000485, filed on Jan. 5, 2022, which is hereby incorporated by reference herein in its entirety.

What is claimed is:

1. An imaging system including a plurality of imaging apparatuses, comprising:
   a finder;
   a first display unit disposed in the finder;
   a second display unit disposed at a position different from a position at which the first display unit is disposed;
   a processor; and a memory storing a program which, when executed by the processor, causes the imaging system to:
      acquire an image capturing instruction;
      detect whether a user is looking at the second display unit;
      perform an image capturing processing in one of a first imaging apparatus and a second imaging apparatus different from the first imaging apparatus, in accordance with whether the user is looking at the second display unit;
      control the imaging element of the first imaging apparatus to perform the image capturing processing in a case where the user is looking at the second display unit; and
      perform control such that the first imaging apparatus requests the second imaging apparatus to perform the image capturing processing in a case where the user is not looking at the second display unit.

2. The imaging system according to claim 1, wherein the image capturing instruction is acquired in accordance with an operation of the user.

3. The imaging system according to claim 2, wherein the operation of the user is a press operation to a release button of the first imaging apparatus.

4. The imaging system according to claim 1, wherein the first imaging apparatus is electrically connected to the second imaging apparatus via plurality of contacts.

5. A control method for an imaging system which includes a plurality of imaging apparatuses, a finder, a first display unit disposed in the finder, and a second display unit disposed at a position different from a position at which the first display unit is disposed, the control method comprising:
   acquiring an image capturing instruction;
   detecting whether a user is looking at the second display unit; and
   performing an image capturing processing in one of a first imaging apparatus and a second imaging apparatus different from the first imaging apparatus in accordance with whether the user is looking at the second display unit;
   wherein the imaging element of the first imaging apparatus is controlled to perform the image capturing processing in a case where the user is looking at the second display unit, and it is controlled such that the first imaging apparatus requests the second imaging apparatus to perform the image capturing processing in a case where the user is not looking at the second display unit.

6. The control method according to claim 5, wherein the image capturing instruction is acquired in accordance with an operation of the user.

7. The control method according to claim 6, wherein the operation of the user is a press operation to a release button of the first imaging apparatus.

8. The control method according to claim 5, wherein the first imaging apparatus is electrically connected to the second imaging apparatus via plurality of contacts.

\* \* \* \* \*